May 10, 1966     O. W. GRAHAM     3,250,685
TREATMENT OF OIL WELL PRODUCTION
Original Filed Dec. 5, 1960
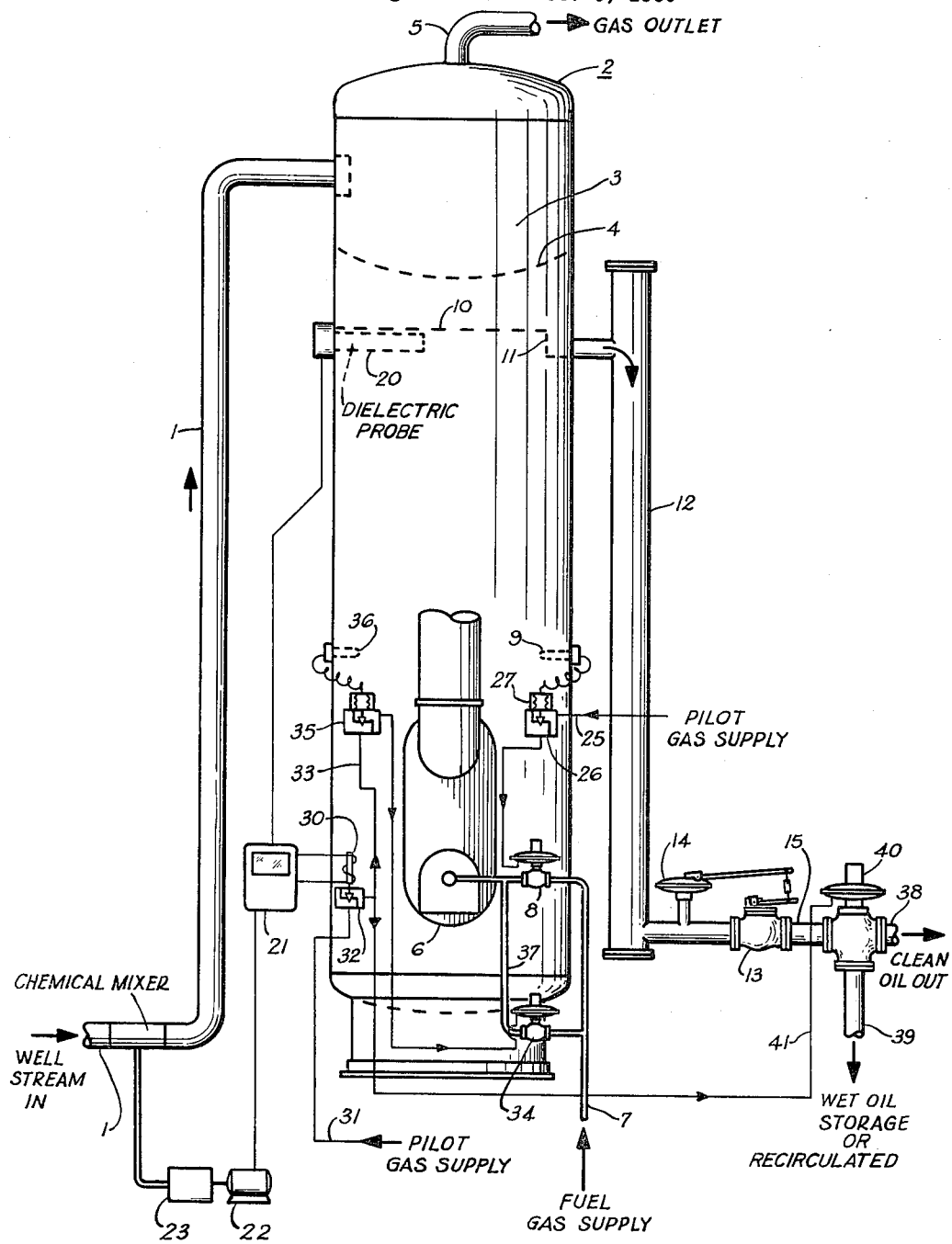
INVENTOR.
OLLIE W. GRAHAM
BY Arthur L Wade
ATTORNEY United States Patent Office 3,250,685
Patented May 10, 1966

3,250,685
TREATMENT OF OIL WELL PRODUCTION
Ollie W. Graham, Tulsa, Okla., assignor to National Tank Company, Tulsa, Okla., a corporation of Nevada
Continuation of application Ser. No. 73,826, Dec. 5, 1960. This application July 2, 1965, Ser. No. 477,062
5 Claims. (Cl. 196—132)

This application is a continuation of applicaton Serial No. 73,826, filed December 5, 1960.

The present invention relates to the operation of a treater for oil well production. More specifically, the invention relates to controlling the firing rate of a treater and feed rate of auxiliary chemicals which supplement the heat in reducing the water content of oil produced from the treater.

The basic sediment and water content of oil processed in the field has been sensed by circuits built in accordance with Gunst U.S. Patent 2,720,624, issued October 11, 1955. The primary element of this circuit is the equivalent of an electrical capacitance. The value of the capacitance is a function of the dielectric constant of the oil in which the primary element is immersed.

The location of the capacitance element in any oil-handling system is a critical problem. If the oil is not dynamically flowed over the capacitance probe, the BS&W will build up about the probe and cause the probe to give a false signal to its circuit. If the pressure on the oil reduces as the oil flows over the probe, some of the oil will evolve as gas, changing the dielectric constant of the mixture in contact with the probe independent of the BS&W content of the mixture.

In the present systems, when there is an increase in the water-cut of the produced oil, the oil is recirculated to the treater. The treater has its firing rate manually adjusted, and additional chemical may be fed into the oil. These measures to increase efficiency of the system are fundamental. However, they are not carried out on an automatic and systematic basis.

It is a primary object of the present invention to detect the dielectric constant of oil processed by a treater prior to pressure reduction on the processed oil.

Another object is to automatically isolate the produced oil from the point of delivery when its water content increases above a predetermined percentage and increase the firing rate of the treater.

Another object is to automatically isolate the produced oil from the point of delivery when the percentage of water in the oil increases above a predetermined percentage and increase the chemical rate added to the process and/or increase the firing rate from the treater.

The present invention contemplates a treater in which a capacitance probe is mounted in the clean oil collection chamber. The probe responds, as a primary element, to the dielectric constant of the oil and any water not removed by the treater and prior to removal of the oil to the lower pressure of storage, or other processing equipment. With this arrangement, the dielectric constant of the oil is not caused to vary by gas breaking out of the liquid oil at the point of measurement. The index of dielectric constant then becomes a stable factor in indicating and/or controlling the water content of oil processed by the treater.

The invention further contemplates a system for automatically diverting the produced oil to a special storage space, or simply recirculating the produced oil through the treater, when the dielectric constant increases a predetermined percentage. When the produced oil is diverted, the firing of the treater is automatically increased a predetermined amount. It is further contemplated that the amount of chemical used to treat the oil be increased by the control system including the capacitance probe detecting the dielectric constant of the produced oil.

Other objects, advantages and features of this invention will become apparent to one skilled in the art upon consideration of the written specifications, appended claims, and attached drawing wherein;

The drawing is an elevation of a complete system, including a treater, embodying the present invention.

*The treater*

The drawing illustrates a system in which a treater is arranged to field-process the fluids of an oil well. The well stream is brought to the system through conduit 1. Conduit 1 takes the well stream into the shell of treater 2. The internal structure and conduits of the treater are not shown in detail, for this might detract from the structure in which the invention is embodied.

An upper separator section 3 is indicated within the upper portion of the treater shell by outlining separator bottom 4. The well stream fluids are introduced into this separator 3 and gaseous constituents remove through conduit 5.

The remaining liquids of the well stream are taken to the lower portion of the treater shell. A direct-fired heater element 6 is shown, supplied fuel gas through pipe 7. This fuel gas is normally regulated by valve 8 which responds to the output of a first temperature responsive system with a primary element 9.

As clean oil is separated from the water of the well stream, it rises to a level 10. Level 10 is spaced a little below separator bottom 4. This clean oil is skimmed off through skimmer structure 11 and is dropped down column 12. Column 12 could be in the form of a heat exchanger bringing the incoming well stream of conduit 1 into heat exchange with the clean oil produced from the treater. For simplicity, column 12 is simply illustrated as a tank in which the clean oil collects up to a level which will actuate discharge valve 13. Specifically, level controller 14 senses the level of clean oil in column 12 and actuates valve 13 to discharge the clean oil to the lower pressure of conduit 15.

The water, separated from the oil, is disposed of by a conduit system not illustrated. Many features of such treater can be illustrated and discussed. However, the drawing here is developed to emphasize that clean oil is collected in a body under the treater pressure which may range up to a few hundred pounds.

*The problem*

Once clean oil is developed under pressure of this magnitude, and at temperatures ranging up to the neighborhood of 100° F., subsequent cooling and pressure reduction in conduit 15 will cause the lighter hydrocarbons to break from the liquid as vapor. This vapor will vary the dielectric constant of the mixture of gas and produced oil. If a capacitance element, as a primary element, is made sensitive to this mixture, the resulting indication of basic sediment and water contaminating the produced oil will be in error. The system will be a poor guide to the effectiveness of the treating. Certainly the BS&W monitor system will be an unreliable device to control the treating process in any manner.

*Solution*

The present invention contemplates placing a capacitance probe directly in the treater shell 2, certainly somewhere ahead of the pressure reduction which develops vapor from the processed hydrocarbons. Representative of this location, probe 20 is placed near the surface 10 of the clean oil, but within the clean oil held under the treating pressure which gives stability to the dielectric contact of the produced oil. The system responding to this probe 20 then becomes a dependable means for controlling the operation of the treater and the system in which the treater is incorporated.

*Control system generally*

Probe 20 is incorporated into the circuit of monitor-controller 21. The circuit of 21 may take the form of that illustrated in Gunst 2,720,624. The circuit disclosed there contemplates control as a function of the circuit. Specifically, electric switches may be controlled by the circuit of 21, and the controlling circuits controlled by the switches are indicated.

Various forces may be used to process the well stream of conduit 1. The heat of burner 6 illustrates only one such force. Chemicals may also be used. These two forces are sufficient to illustrate the various processing forces that can be controlled to monitor the efficiency of the system to produce merchantable oil for delivery to conduit 15 from conduit 1. When the dielectric constant, sensed by probe 20, indicates the produced oil skimmed by 11 into column 12 has an undesirable amount of contaminating material in it, the monitor-controller 21 automatically and systematically diverts the oil delivered to conduit 15 to some depository until the processing efficiency of the system has been increased.

To increase the efficiency of the treating system, the heat input is raised. Also, the amount of chemical introduced into the well stream may be increased. When the probe 20 indicates these measures have had the desired effect of producing merchantable oil at surface 10, the output of conduit 15 is again directed to the purchasing consumer.

*Chemical injection*

Chemical injection is illustrated as carried out by an electric motor 22 driving pump 23. A circuit is indicated between monitor-controller 21 and pump 23. The pump is regulated in any manner necessary to vary the output of chemical pump 23, to chemical mixer 24, mounted in conduit 1. As probe 20 dictates, chemical introduced into the well stream is regulated by this system.

*Normal heating*

As previously indicated, valve 8 regulates fuel gas from pipe 7 to burner 6. Valve 8 is opened and closed by a fluid pressure developed from a supply of gas in pipe 25. As illustrated, the fluid pressure of pipe 25 is applied beneath the diaphragm of valve 8 to overcome its spring force or is isolated from the diaphragm to allow the spring to operate the valve 8.

Isolation of gas valve 8 from pipe 25 and connection of gas valve 8 to pipe 25 is accomplished with valve 26. This valve 26 is simply regulated by the mechanical motion of bellows 27 which is part of a well-known fluid-filled system including temperature responsive bulb 9.

The linkage between bellows 27 and valve 26 is adjusted so the valve 26 will be seated, or raised from its seat, when the temperature to which bulb 9 is exposed reaches a predetermined value. As an example, a normal temperature of 150° F. may be desired at the position where bulb 9 is mounted. Therefore, fuel valve 8 is regulated, by this system, to maintain the 150° F. temperature. Any temperature in excess of 150° F. will close valve 8, isolating burner 6 from this source of fuel gas.

*Higher heating*

If probe 20 indicates an undue amount of water is appearing in the oil produced, an increased rate of firing for burner 6 can be provided. Monitor-controller 21 can establish an electric signal to solenoid 30. This connection between solenoid 30 and monitor-controller 21 is clearly indicated.

Solenoid 30 controls a supply pressure in pipe 31. Specifically, solenoid 30 opens and closes valve 32 in pipe 31. When valve 32 is open, the fluid pressure of pipe 31 is applied to pipe 33. The fluid pressure is then applied to a by-pass valve 34 through a valve 35. Valve 35 is controlled by a temperature responsive bulb 36 in the same manner bulb 9 controls valve 26.

The linkage between the system including bulb 36 and valve 35 is set so a temperature above the 150° F. limit of bulb 9 will be maintained when bulb 36 is effective to control the firing of burner 6. Such higher temperature may be predetermined to be in the neighborhood of 180° F.

The operation of the temperature system is simple and automatic. If the produced oil develops a dielectric constant indicating a prohibitive amount of water has shown up in the oil going to conduit 15, monitor-controller 21 applies the fluid pressure to open fuel valve 34. The temperature of 150° F., or above, on bulb 9 closes valve 8, but valve 34 keeps open until the higher temperature of 180° F. is reached. Fuel valve 8 is by-passed with pipe 37 and valve 34.

*Diversion*

At the time monitor-controller 21 calls for the higher temperature to reduce the water content of the produced oil, it diverts the oil of conduit 15 from conduit 38 to conduit 39. Thus, until the higher heat input has cleaned the oil of its excess water, the wet oil is placed in a special storage where it may be specially treated or recirculated through the system.

To carry out the diversion, valve 40 is employed. Valve 40 is operated by the same fluid pressure signal generated in pipe 33. Specifically, pipe 41 connects with the output of valve 32 to divert at the same time the heat rate is increased.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:
1. A treating system for oil well production including,
   a treater operating under pressure greater than atmospheric,
   a source of heat mounted within the treater,
   valve means connected in the outlet of the treater and through which the clean oil produced from the treater flows to a pressure lower than treater pressure,
   means connected to the treater and detecting the dielectric constant of the produced clean oil and located in the produced oil upstream of the valve means and in proximity to the point of separation,
   and control means connected to the source of heat connected to and adjustable by the detector for the dielectric constant to raise the firing rate of the heat source when the dielectric constant of the oil changes a predetermined amount.
2. A treating system for oil well production including,
   a treater,
   a source of heat mounted in the treater,
   means connected to the treater and detecting the dielectric constant of the produced oil prior to discharge of the oil from treater pressure,
   and a control means connected to the heat source and connected to and adjustable by the detecting means for changing the output of the heat source when the dielectric constant changes a predetermined amount.

3. A treating system for oil well production including,
a treater,
a source of heat mounted in the treater,
means connected to the treater and detecting the dielectric constant of the produced oil prior to discharge of the oil from treater pressure,
means arranged to inject chemical into the production before the production is heated by the heat source mounted in the treater,
and control means connected to the heat source and the chemical injecting means and connected to and adjustable by the detecting means to change the output of the heat source and vary the rate of chemical injection when the dielectric constant changes a predetermined amount.

4. A treating system for oil well production including,
a treater,
a source of heat mounted in the treater,
means connected to the treater and detecting the dielectric constant of the produced oil prior to discharge of the oil from treater pressure,
means connected to the treater with which produced oil is recirculated through the treater,
and a control means connected to the heat source and diverting means and connected to and adjustable by the detecting means to change the output of the heat source and divert the produced oil when the dielectric constant changes a predetermined amount.

5. A treating system for oil well production including,
a treater,
a source of heat mounted in the treater,
means connected to the treater and detecting the dielectric constant of the produced oil prior to discharge of the oil from treater pressure,
means connected to the treater with which produced oil is recirculated through the treater,
and a control means connected to the diverting means and connected to and adjustable by the detecting means to divert the produced oil back through the treater when the dielectric constant changes a predetermined amount.

References Cited by the Examiner
UNITED STATES PATENTS

| | | | |
|---|---|---|---|
| 2,368,447 | 1/1945 | Buchan et al. | 137—88 X |
| 2,654,067 | 9/1953 | Bruce | 324—61 |
| 2,720,624 | 10/1955 | Gunst et al. | 324—61 |
| 2,773,556 | 12/1956 | Meyers et al. | 210—96 X |
| 2,942,689 | 6/1960 | Walker et al. | |
| 3,005,554 | 10/1961 | Kuntz | 324—61 X |
| 3,107,526 | 10/1963 | Kuntz | 324—61 X |

NORMAN YUDKOFF, *Primary Examiner.*

F. E. DRUMMOND, *Assistant Examiner.*